US009473712B2

(12) United States Patent
McCloskey et al.

(10) Patent No.: US 9,473,712 B2
(45) Date of Patent: *Oct. 18, 2016

(54) SYSTEMS AND METHODS FOR PREVENTING FRIENDLY FIRE THROUGH INFRARED RECOGNITION AND AUTHENTICATION

(71) Applicant: WABA FUN, LLC, Broomfield, CO (US)

(72) Inventors: David C. McCloskey, Erie, CO (US); Jeffrey L. Barnett, Fort Collins, CO (US); Stanley R. James, San Francisco, CA (US)

(73) Assignee: Waba Fun, LLC, Broomfield, CO (US)

( * ) Notice: Subject to any disclaimer, the term of this patent is extended or adjusted under 35 U.S.C. 154(b) by 277 days.

This patent is subject to a terminal disclaimer.

(21) Appl. No.: 14/093,383

(22) Filed: Nov. 29, 2013

(65) Prior Publication Data
US 2014/0152840 A1 Jun. 5, 2014

Related U.S. Application Data

(60) Provisional application No. 61/732,157, filed on Nov. 30, 2012.

(51) Int. Cl.
*H04N 5/33* (2006.01)
*G01S 17/74* (2006.01)
(Continued)

(52) U.S. Cl.
CPC ............ *H04N 5/33* (2013.01); *G01S 7/4802* (2013.01); *G01S 17/74* (2013.01); *H04N 5/23219* (2013.01)

(58) Field of Classification Search
CPC . G01S 17/74; G01S 7/4802; H04N 5/23219; H04N 5/33
See application file for complete search history.

(56) References Cited

U.S. PATENT DOCUMENTS

| 5,402,364 A | 3/1995 | Kitoh |
| 5,691,909 A | 11/1997 | Frey et al. |
| 5,966,859 A | 10/1999 | Samuels |

(Continued)

FOREIGN PATENT DOCUMENTS

JP 2004-171109 6/2006

OTHER PUBLICATIONS

PCT/US2013/072507 International Search Report & Written Opinion mailed Mar. 17, 2014; 13 pages.

(Continued)

*Primary Examiner* — Dave Czekaj
*Assistant Examiner* — Md Haque
(74) *Attorney, Agent, or Firm* — Lathrop & Gage LLP

(57) ABSTRACT

Systems and methods prevent friendly fire using infrared object recognition. An IR projector projects a beam of IR radiation at a first wavelength onto the object and an IR detector, having a field of view of the object, detects IR fluorescence from the object, where a wavelength of the fluorescence is a function of the first wavelength. The system includes a memory for storing software having machine readable instructions that, when executed by a processor, perform the steps of: (a) controlling the IR projector to generate IR at the first wavelength; (b) controlling the IR detector to capture the object fluorescence; and (c) identifying the object as friendly or non-friendly based upon the object fluorescence. The system further includes an inhibitor for preventing firing of a gun or missile when the object is identified as friendly.

13 Claims, 5 Drawing Sheets

(51) Int. Cl.
*H04N 5/232* (2006.01)
*G01S 7/48* (2006.01)

(56) References Cited

U.S. PATENT DOCUMENTS

| | | | | |
|---|---|---|---|---|
| 6,123,006 | A * | 9/2000 | Bedford, Jr. | G02B 23/12 89/200 |
| 6,198,394 | B1 * | 3/2001 | Jacobsen | A61B 5/1112 340/10.1 |
| 6,512,993 | B2 | 1/2003 | Kacyra et al. | |
| 6,612,494 | B1 | 9/2003 | Outwater | |
| 7,586,514 | B1 * | 9/2009 | Salazar | F41G 3/02 348/144 |
| 7,841,264 | B2 | 11/2010 | Kim et al. | |
| 8,902,158 | B2 * | 12/2014 | Willis | 345/156 |
| 2004/0188528 | A1 | 9/2004 | Alasia et al. | |
| 2007/0236384 | A1 | 10/2007 | Ivtsenkov et al. | |
| 2008/0038494 | A1 | 2/2008 | Midgley et al. | |
| 2009/0324015 | A1 * | 12/2009 | Way | F41G 7/303 382/103 |
| 2010/0289691 | A1 * | 11/2010 | Ivtsenkov | A61B 5/6814 342/45 |
| 2011/0055053 | A1 | 3/2011 | Rutschmann | |
| 2011/0063102 | A1 * | 3/2011 | Ivtsenkov | F41A 17/063 7/63 |
| 2011/0075916 | A1 | 3/2011 | Knothe et al. | |

OTHER PUBLICATIONS

MaxMax, Upconversion, Aug. 30, 2012, accessed on the Internet May 22, 2013, http://www.maxmax.com/alRUpConversion.asp; 3 pages.
MaxMax, IR Ink, Aug. 30, 2012, accessed on the Internet May 22, 2013, http://www.maxmax.com/aXRayIRInks.asp; 6 pages.
New Prismatic Co., Invisible Fluorescent Material, Sep. 6, 2010, accessed on the Internet May 22, 2013, http://www.colorchange.com.tw/english/index.php/invisible-fluorescent-introduction.html; 3 pages.

* cited by examiner

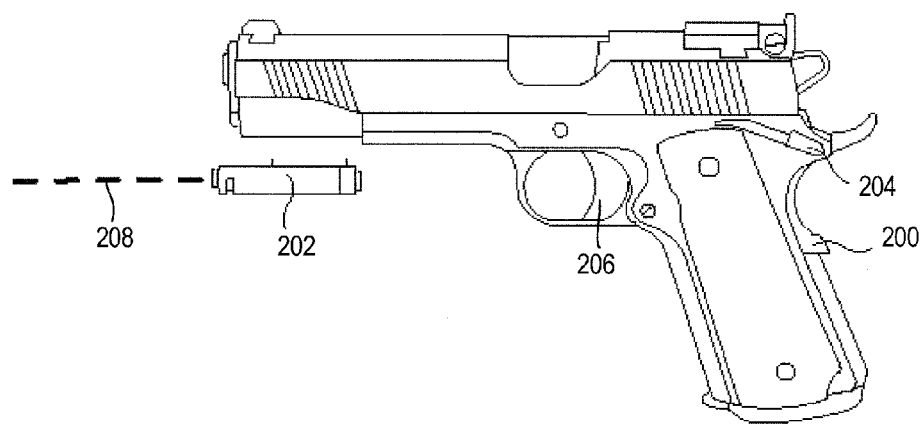
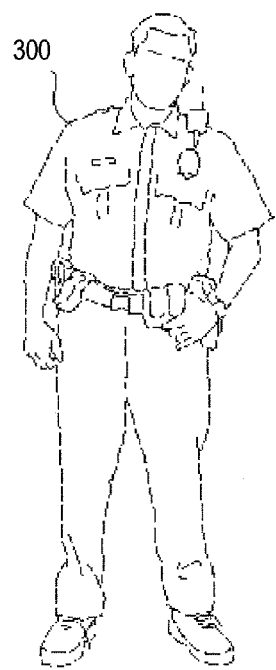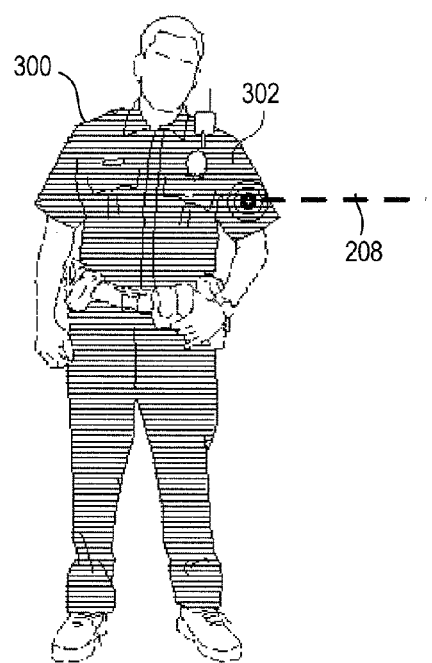
FIG. 3
FIG. 4  FIG. 5

SYSTEMS AND METHODS FOR PREVENTING FRIENDLY FIRE THROUGH INFRARED RECOGNITION AND AUTHENTICATION

RELATED APPLICATIONS

This application claims priority to U.S. Provisional Patent Application No. 61/732,157, filed Nov. 30, 2012 and incorporated herein by reference.

BACKGROUND

Friendly fire or blue on blue incidents are often seen as an unavoidable result of combat, whether in the military arena or in the course of police work. Although these incidents only account for a small percentage of overall military or police casualties, they have a great negative impact on morale, causing forces to doubt the competence of both their command and their fellow soldiers or officers. Although friendly fire may be attributed to a general "fog of war", errors of identification and/or faulty technology are often to blame.

For example, poor terrain and visibility may disorient soldiers such that they cannot easily identify the direction from which enemy fire originates. Low visibility conditions may also result in the shooting of a friend mistaken as a foe. Combat stress may cause panic or clouded judgment amongst soldiers or officers. Highly mobile battles may result in low-level disorientation, as both landmarks and the relative position of enemy forces are subject to change. Battles involving troops from many nations may also lend to errors in differentiating a fellow soldier from an enemy. The shooting down of a British aircraft by a U.S. Patriot battery during the Invasion of Iraq and the Tarnak Farm Incident, both during the first Gulf War, are examples of friendly fire amongst multi-national allies.

Throughout history, attempts have been made to reduce friendly fire through enhanced recognition. From the earliest days of warfare, armies adopted unique suits of armor and/or crests to distinguish themselves from enemy forces. During World War II, Allied aircraft were painted with invasion stripes prior to the invasion of Normandy, to assist in identifying the aircraft. Later, German aircraft were brightly painted to distinguish them from Allied fighter planes. The advent of radar led to identification of aircraft via radio beacons. However, as evidenced by tragedies such as the 1994 Black Hawk shoot-down incident, the American-on-American bombing during the Battle of Nasiriyah (2003), and the April, 2011 killing of two U.S. servicemen (mistaken for Taliban fighters) by a U.S. Predator drone, the technology of recognition has not kept pace with other technologies of war.

SUMMARY

The disclosed systems and methods advance the art of friendly fire prevention by providing enhanced infrared object recognition and authentication, and by preventing firing of a weapon when an object is recognized and/or authenticated.

In one embodiment, a system for preventing friendly fire using infrared object recognition includes an IR projector for projecting a beam of IR radiation at a first wavelength onto the object, and an IR detector having a field of view of the object for detecting IR fluorescence from the object, a wavelength of the fluorescence being a function of the first wavelength. The system includes a memory for storing software having machine readable instructions that, when executed by a processor, perform the steps of: (a) controlling the IR projector to generate IR at the first wavelength; (b) controlling the IR detector to capture the object fluorescence; and (c) identifying the object as friendly or non-friendly based upon the object fluorescence. The system further includes an inhibitor for preventing firing of a gun or missile when the object is identified as friendly.

BRIEF DESCRIPTION OF THE FIGURES

FIG. 3 is a side view of a gun with an IR cartridge, according to an embodiment.

FIG. 4 is a schematic view illustrating invisibility of a police officer not wearing an IR fluorescing material, or not wearing a material that fluoresces at a frequency recognized by the system of FIG. 1.

FIG. 5 is a schematic view showing a police officer whose uniform incorporates a material that fluoresces at a frequency recognized by the system of FIG. 1.

DETAILED DESCRIPTION OF THE DRAWINGS

An IR fluorescing material receives energy in the form of light at a first wavelength range and converts that energy into light emitted at a second wavelength band. Normally, materials that fluoresce are down-conversion particles that absorb energy at a higher level and shorter wavelength (ultraviolet) and emit energy at a lower level and longer wavelength (visible). Up-conversion materials are a very rare class of inorganic crystals that can absorb multiple photons at a lower energy level and emit one photon at a higher energy level. The up-conversion process is also called an Anti-Stokes shift (see for example http://en.wikipedia.org/wiki/Stokes_shift and http://en.wikipedia.org/wiki/Photon_up-conversion). One or more of many different IR fluorescing material may be used without departing from the scope hereof. See for example:

New Prismatic Co. manufactures invisible fluorescent materials suitable for use in toys:
http://www.colorchange.com.tw/english/index.php/invisible-fluorescent-introduction.html;
Up-conversion phosphors from MaxMax in NJ:
http://www.maxmax.com/aIRUpConversion.asp;
Down-conversion Inks from MaxMax:
http://www.maxmax.com/aXRayIRInks.asp; and
An illuminating illustration on Light and Emissions:
http://www.hindawi.com/journals/jnm/2010/491471/fig1/

Figure 1:
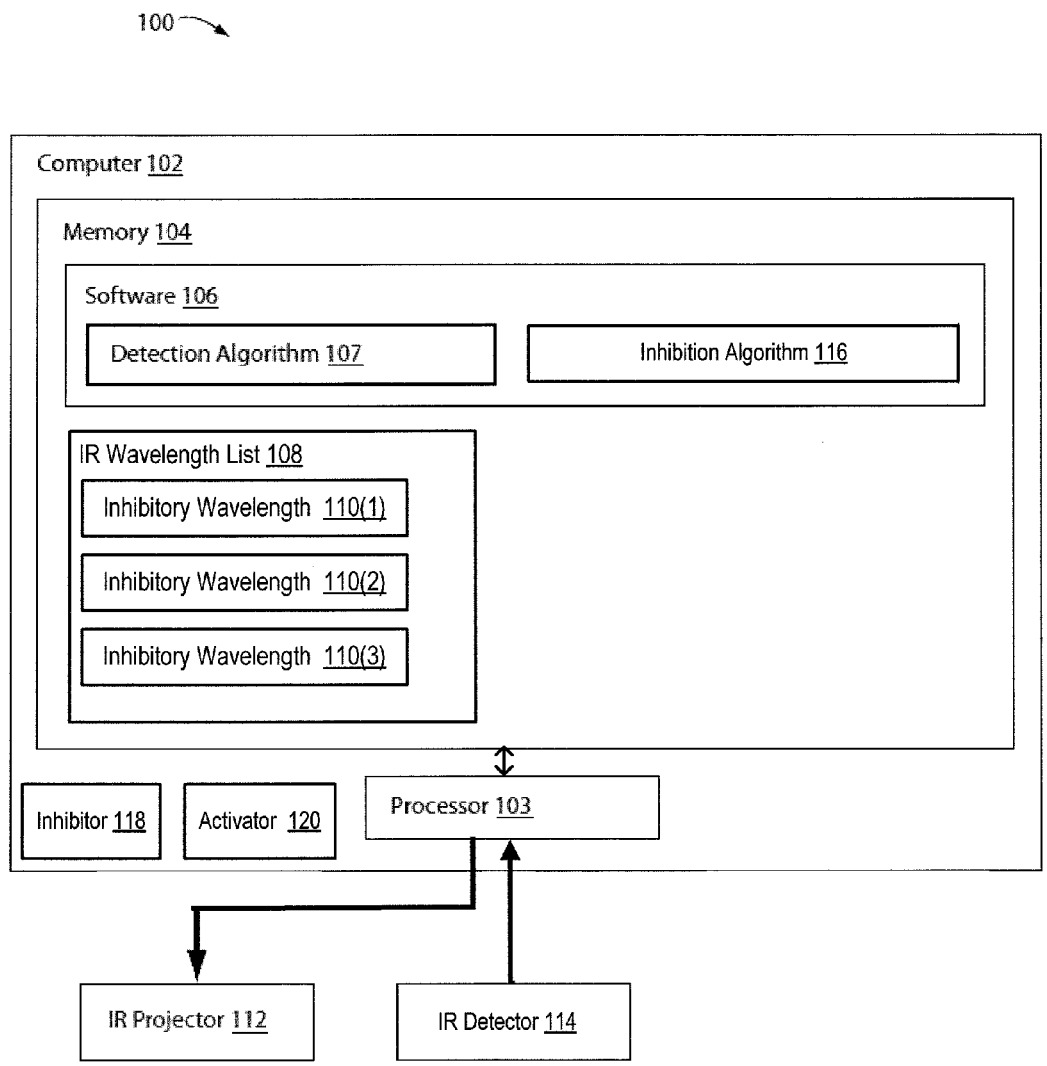
FIG. 1 is a block diagram illustrating a system for preventing friendly fire through infrared recognition, according to an embodiment.

FIG. 1 is a block diagram of an exemplary system 100 for preventing friendly fire through infrared recognition. System 100 includes a computer 102 executing software 106, an IR projector 112 and an IR detector 114. IR projector 112 and IR detector 114 are communicatively coupled with computer 102, and may be contained within a single housing or separately housed. Computer 102 is for example a microprocessor, and is shown with memory 104 that stores software 106 and a processor 103 that may execute machine readable instructions of software 106. Memory 104 may represent one or both of volatile memory, such as dynamic random access memory (DRAM), and non-volatile memory, such as hard drive storage, of computer 102. Memory 104 stores an infrared (IR) wavelength list 108 containing one or more inhibitory or "friendly" IR wavelengths 110 that may be identified by system 100. Wavelengths 110 are IR fluorescence wavelengths of one or more IR fluorescing materials incorporated into or onto a "friendly" object, such as the badge or clothing of a police or military officer, a tank, an aircraft or artillery. The IR fluorescing materials are chosen based upon the wavelength or IR emitted by IR projector 112 and their corresponding IR fluorescence wavelength. For example, an IR fluorescing material is selected to emit IR at a wavelength of 880 nm when excited by IR with a wavelength of 820 nm and is applied to or incorporated into a flak jacket. IR materials that fluoresce at a wavelength listed within list 108 may be referred to hereinafter as "friendly IR fluorescing materials".

Software 106, when executed by processor 103, controls IR projector 112 and IR detector 114 to detect friendly wavelengths 110. Software 106 includes a detection algorithm 107 and an inhibition algorithm 116 that cooperate to determine whether an inhibitory wavelength has been detected by detector 114 by comparing an IR fluorescence from the object (as detected by detector 114) with wavelengths 110 of wavelength list 108. If the wavelength of detected IR fluorescence is within wavelength list 108, inhibition algorithm 116 controls an inhibitor 118 to prevent the gun from firing.

Inhibitor 118 inhibits firing of a gun, for example by locking the trigger, and may operate in one of two modes. In a first mode, inhibitor 118 is "on" except when released by inhibition algorithm 116 (e.g., when an object illuminated by IR projector 112 does not return IR fluorescence at a wavelength within wavelength list 108), such that the gun does not fire unless the inhibitor is released. Inhibitor 118 is for example an electronic safety that is released upon receipt of an arming signal from processor 103. In a second mode, inhibitor 118 is normally "off", wherein inhibition algorithm 116 activates inhibitor 118 only when detector 114 detects IR fluorescence with a wavelength identified as a friendly frequency 110 within list 108, such that the gun cannot be fired when pointed at that object. Inhibitor 118 may again be an electronic safety that is in this case activated upon detection of IR fluorescence at one or more friendly frequencies 110. It will be appreciated that although described with respect to a handgun, system 100 may also be incorporated into or used with heavy artillery, drone planes and other ammunition or missile launch systems.

As shown in FIG. 1, system 100 includes an activator 120 in communication with processor 103. Activator 120 is additionally in communication with an activation area of the gun, such as the trigger. When activator 120 detects (i.e., receives a signal indicative of) pressure upon the trigger, system 100 turns on IR projector 112, for example via processor 103. IR projector 112 then projects IR radiation of a first (preselected) wavelength along the firing line of the gun. IR projector 112 for example produces an IR beam in the direction in which the weapon is pointed, similar to a laser sight.

Where the IR beam from IR projector 112 strikes an object configured with one or more friendly IR fluorescing materials, IR detector 114 detects IR fluorescence from the object and detection algorithm 107 compares the wavelength of the detected IR fluorescence with list 108. Inhibitor 118 is controlled to inhibit operation of the gun when the detected wavelength is found within list 108 (i.e., the object is considered "friendly") and operates to enable operation of the gun when the IR fluorescence is missing or at a wavelength not found in list 108 (i.e., no friendly object is detected).

It will be appreciated that system 100 is capable of emitting IR radiation, detecting an incoming wavelength, comparing the wavelength with inhibitory wavelengths of list 108 and locking or unlocking the gun's trigger within a fraction of a second. Therefore, system 100 may prevent friendly fire accidents by recognizing a non-target under conditions in which a shooter might mistakenly fire at the non-target (e.g., low visibility conditions, stress, panic, disorientation). It will be appreciated that system 100 may, in the embodiment of FIG. 1, detect combinations of friendly IR fluorescing materials. For example, multiple friendly IR fluorescing materials may be combined to create an object code. Detection of multiple IR wavelengths or a wavelength code may allow for more positive identification of an object as "friendly".

Figure 2:
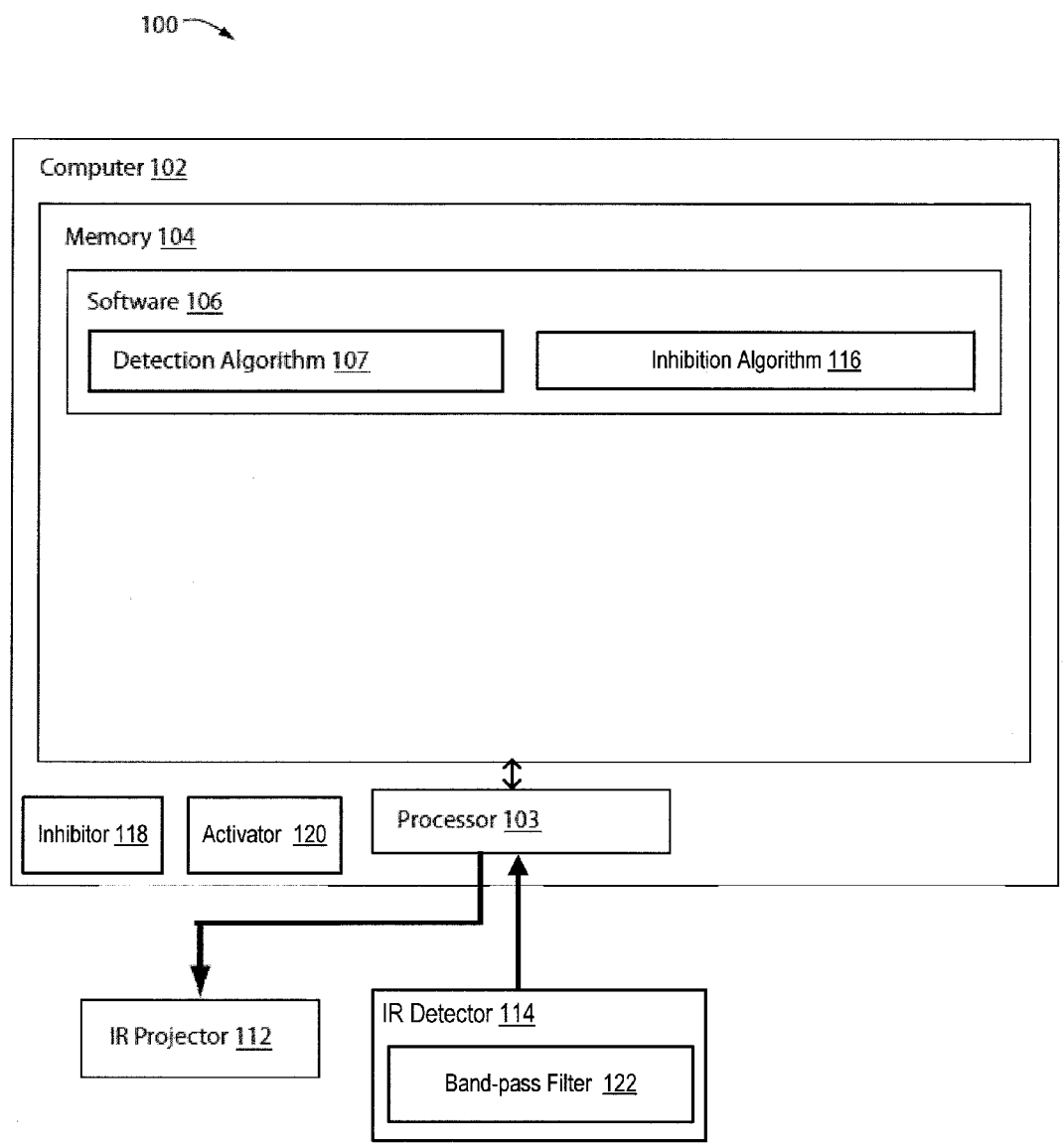
FIG. 2 is a block diagram illustrating a system for preventing friendly fire through infrared recognition, according to an embodiment.

In an alternative embodiment, shown in FIG. 2, detector 114 is configured with a band-pass filter 122 that only allows IR at a wavelength of fluorescence from friendly IR fluorescing materials to pass into detector 114. Detector 114 thereby operates to detect receipt or non-receipt of IR fluorescence from friendly fluorescing materials. In this embodiment, list 108 is omitted and detection algorithm enables or disables inhibitor 118 based upon presence or absence of detected IR fluorescence.

In one aspect related to the system as shown in FIG. 1, upon activation of system 100 by activator 120, IR detector 114 images an object in the line of fire of a gun prior to activating IR projector 112, and then images the object as illuminated by IR projector 112. The "off" and "on" images are compared to detect a difference therebetween, the difference indicating presence of an IR fluorescing material in the gun's line of sight. For example, the "off" image is subtracted from the "on" image to remove background "noise" and thereby better detect IR fluorescence if present. Wavelength or frequency of the IR fluorescing material is then compared with wavelengths 110 of list 108 to determine whether the fluorescing material is a friendly IR fluorescing material. This "off" and "on" imaging may repeat continuously (e.g., while pressure is applied to the gun's trigger), for example at a rate of 60 images per second or greater to ascertain whether or not a friendly IR fluorescing material is within gun's line of sight. In one embodiment, projector 112 creates an oscillating or pulsed IR beam and IR detector captures images of the object both when illuminated and not illuminated by a beam from IR projector 112. Again, the "off" image is subtracted from the "on" image to improve detection of a friendly IR fluorescing material.

In an aspect related to the system as shown in FIG. 2, upon activation of system 100, IR detector 114 images an object in the line of fire of a gun, either continuously with activation of IR projector 112, or before and after activating IR projector 112 (and then continuously, as described above) to determine presence of an IR fluorescing material. Band-pass filter 122 filters out IR radiation of wavelengths other than expected from friendly IR fluorescing material such that the gun's trigger is locked, as described above, only when IR fluorescence from one or more friendly IR fluorescing materials is detected.

FIG. 3 shows a handgun 200 with an IR cartridge 202. IR cartridge 202 may include all of system 100, so long as system 100 is in wired or wireless communication with a safety 204 and/or trigger 206 of handgun 200. In an alternative embodiment, components of system 100 are distributed between cartridge 202 and handgun 200. For example, existing computer controls of gun 202 may be programmed, via software 106, to serve as computer 102. In another example, IR cartridge 202 includes IR projector 112 and IR detector 114, with activator 120, inhibitor 118 and other components of system 100 incorporated with the body of gun 200. It will be appreciated that components of system 100 may be otherwise shared between cartridge 202 and gun 200. Cartridge 202 may be removably or permanently attached to gun 200. When system 100 is activated, e.g., by a handler of gun 200 applying pressure to trigger 206, IR projector 112 emits a beam of infrared radiation 208.

FIGS. 4 and 5 schematically represent non-recognition and recognition of a police officer 300 by system 100. The officer shown in dotted outline in FIG. 4 is "invisible" to system 100. That is, nothing that officer 300 is wearing or holding fluoresces at an IR wavelength which passes through band-pass filter 122 (in the embodiment of FIG. 2), or which is contained within list 108 (in the embodiment of FIG. 1) when excited by IR beam 208 from IR projector 112. Thus officer 300 and his clothing are not recognized as "friendly" or inhibitory, and firing of handgun 200 is permitted.

In contrast, in FIG. 5, officer 300 wears clothing 302 configured with a friendly IR fluorescing material (e.g., the friendly IR fluorescing material is provided as a coating on the clothing or is configured within threads of the clothing). The friendly IR fluorescing material may be colorless, or may blend into the officer's clothing, such that it is undetectable to the human eye. However, when illuminated by IR beam 208 from IR projector 112, the clothing emits IR at a wavelength that passes through filter 122 or is listed within list 108. IR fluorescence from the officer's clothing is therefore "seen" or detected by IR detector 114, and system 100 thereby prevents a gun directed at officer 300 from firing (i.e., inhibitor 118 locks the trigger).

Although shown as a linear beam, IR beam 208 may diverge slightly to illuminate a wider area of an object (i.e., police officer 300) in order to strike a portion of the friendly IR fluorescing material of an officer's clothing even if the gun is aimed at a non-fluorescing area of the officer, such as the officer's head. Slight divergence allows IR illumination and detection from a greater distance while still ensuring recognition of friendly IR fluorescing materials.

Figure 6:
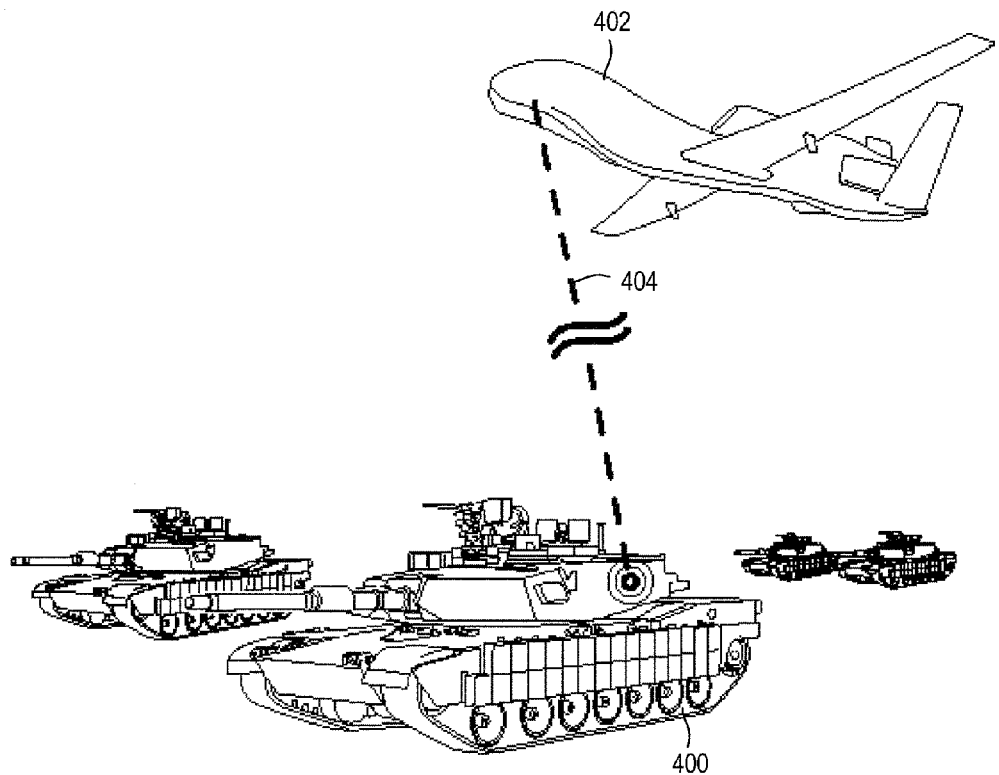
FIG. 6 illustrates use of the system of FIGS. 1 and 2 in a military application.
Figure 7:
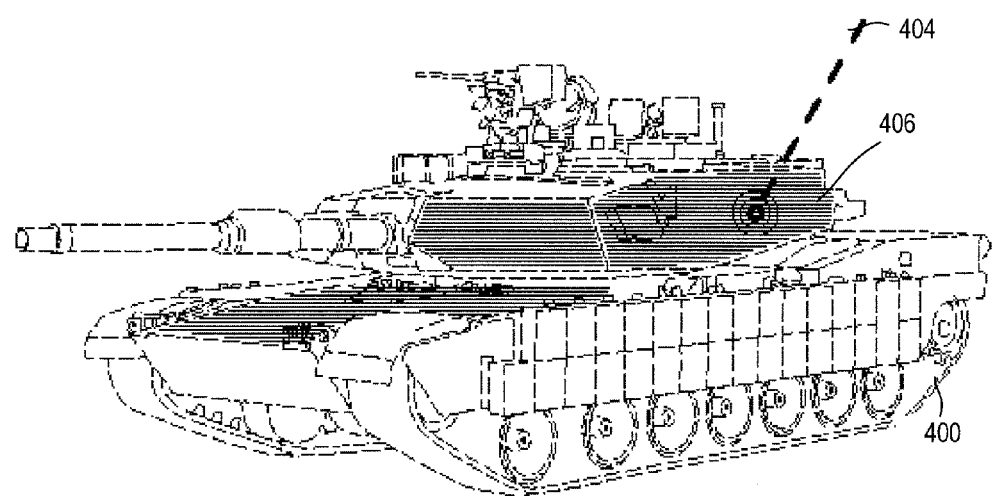
FIG. 7 further illustrates use of the system of FIGS. 1 and 2 in a military application.

FIGS. 6 and 7 illustrate exemplary military use of system 100. A tank 400 is manufactured, coated with or otherwise incorporates a friendly IR fluorescing material. System 100 is carried by or incorporated into aircraft 402. Either continuously during flight, while within a target area, or upon visual identification of an object on the ground, an IR beam 404 emits from aircraft 402/IR projector 112 as described above. Beam 404 strikes tank 400 (FIG. 6) and IR fluorescing material 406 of tank 400 fluoresces in response to beam 404 (as shown in FIG. 7). System 100 detects IR fluorescing material 406 and inhibits firing or missile launch in a manner described above.

It will be appreciated that use of system 100 may facilitate night attacks on enemy tanks or other targets, as IR fluorescence may be detected and "friendly" objects avoided. It will also be appreciated that a system for preventing friendly fire through infrared object recognition and authentication may include other features to facilitate system use with drone aircraft, cruise missiles and other "pilotless" machines and artillery. For example, where a military machine is remotely controlled, system 100 may be combined with a video camera and output of system 100 relayed to a remote operator with video output, in real time. Such enhancements permit a remote operator to both visually identify an object (i.e., tank versus school) and to determine whether the object is friend or foe, with the added safety of firing prevention where a friendly IR fluorescing material is detected.

Figure 8:
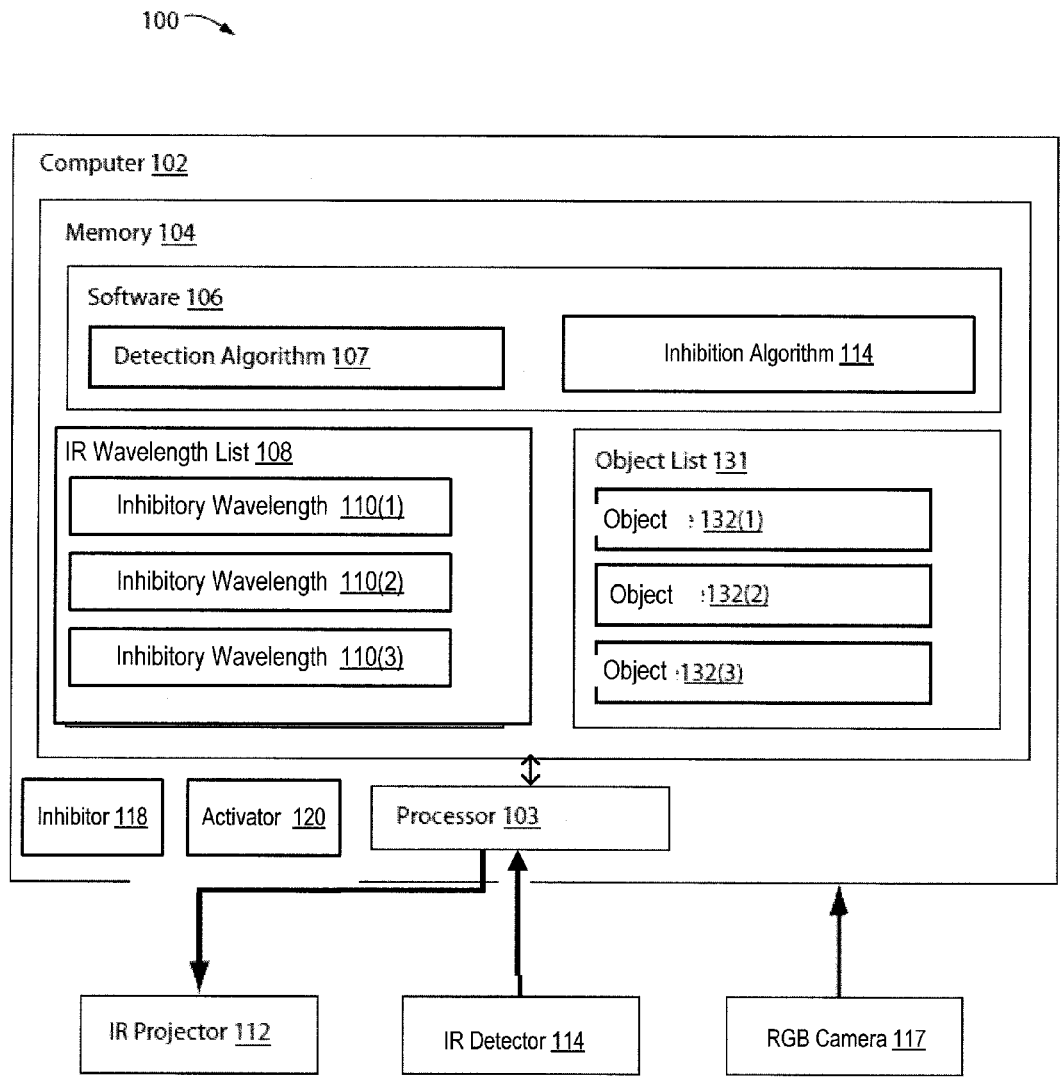
FIG. 8 is a block diagram illustrating the system of FIG. 1 or 2 incorporating object identification through use of an additional RGB camera.

As shown in FIG. 8, system 100 includes an RGB camera 117, and Memory 104 includes an object list 131 including objects 132. Images or an image stream from RGB camera 117 are/is compared with objects 132 within object list 131, to identify the objects. Exemplary objects within object list 131 are artillery, tanks, aircraft and buildings, although it will be appreciated that other objects may be included and identified by system 100. Detection algorithm 107 determines whether the imaged object incorporates a friendly IR fluorescing material, thus allowing for differentiation between friendly and non-friendly weapons of war, aircraft, tanks and other objects.

System 100 may also process IR and/or an image or image stream to authenticate an object. For example, system 100 may include an IR camera (e.g., IR detector 114) to image IR fluorescence from an object 132 (e.g., tank 400) when illuminated by an IR beam (e.g., IR beam 208/404) from an IR projector (e.g., IR projector 112). Object 132 may incorporate, be coated with, or otherwise include one or more IR fluorescing materials. The IR fluorescing material(s) may be applied in a unique pattern or combination, which is memorialized in object list 131 in association with object 132. Upon detection of IR fluorescence (i.e., fluorescence from IR fluorescing material 406 in tank 400), an authentication algorithm processes the IR image to authenticate the object 132 as being the object defined in object list 131, based upon the wavelength/combination/pattern of detected IR within the IR image. For example, where the wavelength of detected IR from object 132 (tank 400) does not match the defined wavelength within object list 131, or there is no IR detected from the object, then the object is determined as not authentic. If the object is authenticated, system 100 inhibits firing or missile launch as described above.

An RGB camera may additionally be incorporated into system 100 and RGB images relayed to a remote operator as described above, such that visual confirmation of a non-authentic object may be made. Visual confirmation may also guard against accidental "friendly fire" on a friendly tank or other friendly object that has been damaged sufficiently to alter its fluorescence response (for example, where IR-fluorescing paint has been scraped or burned), such that it is not recognized by system 100 and firing/launch is not inhibited.

System 100 may be incorporated into heavy artillery, anti-aircraft missiles, cruise missiles, drone or piloted aircraft, tanks, and other machines of war. It will be appreciated that missiles incorporating system 100 may be programmed to steer away from objects incorporating a friendly fluorescing material.

Combinations of Features

Features described above as well as those claimed below may be combined in various ways without departing from the scope hereof. The following examples illustrate possible, non-limiting combinations of features of the inventions described above. It should be clear that many changes and modifications may be made to the systems and methods described above without departing from the spirit and scope of this invention:

(a) A system for preventing friendly fire using infrared (IR) object recognition includes an IR projector for projecting a beam of IR radiation at a first wavelength onto the object. An IR detector having a field of view of the object detects IR fluorescence from the object, a wavelength of the fluorescence being a function of the first wavelength. A processor executes an algorithm to perform steps of: controlling the IR projector to generate IR at the first wavelength and project the IR onto the object; controlling the IR detector to detect the object fluorescence; and identifying the object as friendly when the object fluorescence is detected. An inhibitor prevents firing of a gun or missile when the object is identified as friendly.

(b) In the system denoted as (a), an activator initiates projection by the IR projector. The activator may be in communication with or configured with an activating area of the gun or missile.

(c) In the system/s denoted as (b), the activating area may be the trigger of a gun.

(d) In the system/s denoted as (a)-(c), the inhibitor may be, or the inhibitor may be in communication with, an electronic safety of the gun, to lock the gun when the object is identified as friendly.

(e) In the system/s denoted as (a)-(d), a band-pass filter may filter out IR at wavelengths other than fluorescence wavelengths of friendly IR fluorescing material.

(f) In the system/s denoted as (a)-(e), a memory may store an IR wavelength list of inhibitory wavelengths; wherein the inhibitor is activated when the IR detector detects IR with an inhibitory wavelength.

(g) In the system/s denoted as (a)-(f), the system may be incorporated with a gun.

(h) In the system/s denoted as (a)-(f), the system may be incorporated with a military aircraft or a weapons system of a military aircraft.

(i) In the system/s denoted as (a)-(f), the system may be incorporated with a tank and/or weapons system of a tank.

(j) In the system/s denoted as (a)-(f), the system may be incorporated with an anti-aircraft gun.

(k) In the system/s denoted as (a)-(f), the system may be incorporated with heavy artillery.

(l) In the system/s denoted as (a)-(k), the IR projector and the IR detector may be configured with a cartridge that permanently or removably attaches with a gun, weapons system or heavy artillery.

(m) A system for preventing friendly fire using infrared object recognition may include an IR projector for projecting a beam of IR radiation at a first wavelength onto the object. An IR detector having a field of view of the object may detect IR fluorescence from the object, a wavelength of the fluorescence being a function of the first wavelength. An RGB camera may capture a still or moving picture of the object. The system may further include a processor. A memory for storing software may include machine readable instructions that, when executed by the processor, perform the steps of: identifying the object from an object list, based upon the still or moving picture from the RGB camera; controlling the IR projector to generate IR at the first wavelength; controlling the IR detector to capture the object fluorescence; and identifying the object as friendly or non-friendly based upon the object fluorescence. The system may further include an inhibitor for preventing firing of a gun or missile when the object is identified as friendly.

(n) A system for preventing friendly fire using infrared (IR) recognition of an object may include an IR detector having a field of view of the object for detecting IR fluorescence from the object when illuminated by an IR beam. A processor may execute an algorithm to perform the steps of: controlling the IR detector to detect the object fluorescence; identifying the object as friendly or non-friendly based upon whether the object fluorescence is detected. An inhibitor may prevent firing of a gun or missile when the object is identified as friendly.

(o) In the system denoted as (n), a memory may store an IR wavelength list of inhibitory wavelengths; wherein the inhibitor is activated when the IR detector detects IR with an inhibitory wavelength.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for preventing friendly fire using infrared (IR) object recognition, comprising:
an IR projector for projecting a beam of IR radiation at a first wavelength onto the object; an IR detector having a field of view of the object for detecting IR fluorescence from the object, a wavelength of the fluorescence having a second wavelength that is a function of the first wavelength; a processor executing an algorithm to perform the steps of:
controlling the IR projector to generate IR at the first wavelength and project the IR onto the object; controlling the IR detector to detect the object fluorescence; and identifying the object as friendly when the object fluorescence is detected; and
an inhibitor for preventing firing of a gun or missile when the object is identified as friendly, and a memory storing an IR wavelength list of inhibitory wavelengths; wherein the inhibitor is activated when the IR detector detects IR with an inhibitory wavelength.

2. The system of claim 1, further comprising an activator for initiating projection by the IR projector, the activator being in communication with or configured with an activating area of the gun or missile.

3. The system of claim 2, the activating area being the trigger of a gun.

4. The system of claim 1, the inhibitor being or being in communication with an electronic safety of the gun, to lock the gun when the object is identified as friendly.

5. The system of claim 1, further comprising a band-pass filter for filtering out IR at wavelengths other than fluorescence wavelengths of friendly IR fluorescing material.

6. The system of claim 1, wherein the system is incorporated with a gun.

7. The system of claim 1, wherein the system is incorporated with a military aircraft.

8. The system of claim 1, wherein the system is incorporated with a tank.

9. The system of claim 1, wherein the system is incorporated with an anti-aircraft gun.

10. The system of claim 1, wherein the system is incorporated with heavy artillery.

11. The system of claim 6, the IR projector and the IR detector being configured with a cartridge that permanently or removably attaches with the gun.

12. A system for preventing friendly fire using infrared object recognition, comprising:
an IR projector for projecting a beam of IR radiation at a first wavelength onto the object; an IR detector having a field of view of the object for detecting IR fluorescence from the object, the fluorescence having a second wavelength that is a function of the first wavelength;
an RGB camera for capturing a still or moving picture of the object;
a processor;
a memory for storing software having machine readable instructions that, when executed by the processor, perform the steps of:
identifying the object from an object list, based upon the still or moving picture from the RGB camera;
controlling the IR projector to generate IR at the first wavelength;
controlling the IR detector to capture the object fluorescence; and
identifying the object as friendly or non-friendly based upon the object fluorescence; and an inhibitor for preventing firing of a gun or missile when the object is identified as friendly; wherein the inhibitor is activated when the IR detector detects IR with an inhibitory wavelength.

13. A system for preventing friendly fire using infrared (IR) recognition of an object, comprising:
an IR detector having a field of view of the object for detecting IR fluorescence from the object when illuminated by an IR beam, wherein the IR fluorescence has a wavelength that is a conversion of the IR beam;
a processor executing an algorithm to perform the steps of:
controlling the IR detector to detect the object fluorescence; and
identifying the object as friendly or non-friendly based upon whether the object fluorescence is detected; and
an inhibitor for preventing firing of a gun or missile when the object is identified as friendly, and a memory storing an IR wavelength list of inhibitory wavelengths; wherein the inhibitor is activated when the IR detector detects IR with an inhibitory wavelength.

\* \* \* \* \*